United States Patent
Chen et al.

(10) Patent No.: US 11,699,970 B2
(45) Date of Patent: Jul. 11, 2023

(54) DRIVING VOLTAGE GENERATION METHOD, AND LINEAR MOTOR DRIVING VOLTAGE GENERATION DEVICE PERFORMING SAME

(71) Applicant: AAC Acousitc Technologies (Shanghai) Co., Ltd., Shanghai (CN)

(72) Inventors: Yongyong Chen, Shenzhen (CN); Zheng Xiang, Shenzhen (CN); Yajun Zheng, Shenzhen (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/566,670

(22) Filed: Dec. 30, 2021

(65) Prior Publication Data

US 2023/0116069 A1    Apr. 13, 2023

(30) Foreign Application Priority Data

Sep. 26, 2021  (CN) .............................. 202111127052.1

(51) Int. Cl.
*H02P 25/06*    (2016.01)

(52) U.S. Cl.
CPC .................................. *H02P 25/06* (2013.01); *H02P 2209/11* (2013.01)

(58) Field of Classification Search
CPC ...................................................... H02P 25/06
See application file for complete search history.

(56) References Cited

U.S. PATENT DOCUMENTS

| | | | | |
|---|---|---|---|---|
| 7,868,489 | B2* | 1/2011 | Amemiya et al. | H02K 33/00 310/13 |
| 7,956,498 | B2* | 6/2011 | Amemiya et al. | H02K 35/04 310/13 |
| 2019/0391654 | A1* | 12/2019 | Taninaka et al. | B06B 1/045 |
| 2020/0264037 | A1* | 8/2020 | Chen | G06F 3/016 |
| 2021/0041847 | A1* | 2/2021 | Guo et al. | H02K 33/00 |
| 2021/0042519 | A1* | 2/2021 | Xiang et al. | G06K 9/0053 |

FOREIGN PATENT DOCUMENTS

JP          2012034561 A *  2/2012

* cited by examiner

*Primary Examiner* — Thai T Dinh
(74) *Attorney, Agent, or Firm* — W&G Law Group

(57) ABSTRACT

The present invention provides a driving voltage generation method of a linear motor, and linear motor driving voltage generation device performing same. The driving voltage generation method of a linear motor includes the following. Define the displacement waveform of the linear motor's vibrator within a preset period and the displacement waveform is an asymmetrical waveform. Calculate the voltage waveform corresponding to the linear motor in the preset period according to the displacement waveform. The present invention is designed to use the driving voltage generated by the driving voltage generation method to effectively control the linear motor to express the vibration effect in a specific direction.

10 Claims, 6 Drawing Sheets

DRIVING VOLTAGE GENERATION METHOD, AND LINEAR MOTOR DRIVING VOLTAGE GENERATION DEVICE PERFORMING SAME

FIELD OF THE PRESENT DISCLOSURE

The present invention belongs to the technical field related to linear motor driving, in particular to the driving voltage generation method of linear motor and related devices.

DESCRIPTION OF RELATED ART

In the prior art, haptic feedback plays an important role in the interactive experience of electronic products, and the form of haptic feedback is often realized through vibration of a linear motor. Can bring users an immersive real experience. In the prior art, linear motors, which provide vibration effect generators, are more and more widely used in high-end mobile phones. However, the current application of linear motor in mobile phones only provides users with a vibration reminder. The user cannot perceive a clear direction of vibration from it.

Therefore, it is necessary to provide a method and related devices that enable users to perceive the vibration direction of the linear motor.

SUMMARY OF THE PRESENT INVENTION

One of the main objects of the present invention is to provide a driving voltage generation method which perceive a clear direction of a linear vibration motor.

Another object of the invention is to a generation device for performing and executing the generation method mentioned above.

To achieve the above-mentioned objects, the present invention provides a driving voltage generation method of a linear motor, including steps of:
defining a displacement waveform of the linear motor's vibrator within a preset period, the displacement waveform being an asymmetrical waveform;
calculating a voltage waveform corresponding to the linear motor in the preset period according to the displacement waveform.

In addition, the step of defining the displacement waveform of the linear motor within a preset period includes:
defining a fundamental frequency waveform of the linear motor's vibrator within the preset period, the fundamental frequency waveform being formed by splicing a first frequency waveform and a second frequency waveform having opposite directions and being asymmetrical;
using the fundamental frequency waveform as the displacement waveform of the linear motor's vibrator.

In addition, the step of forming the fundamental frequency includes:
forming the fundamental frequency waveform by sequentially splicing the first frequency waveform and the second frequency waveform; a first time period that the first frequency waveform occupies the preset period is shorter than a second time period that the second frequency waveform occupies the preset period; or, the second time period that the second frequency waveform occupies the preset period is shorter than the first time period that the first frequency waveform occupies the preset period.

In addition, when the first time period of the preset period occupied by the first frequency waveform is shorter than the second time period of the preset period occupied by the second frequency waveform, the condition below is satisfied:

$$\delta = f_1 - \frac{f}{2} > 0, \text{ and } \delta \in \left(\frac{f}{2}, \infty\right)$$

where
δ means frequency difference;
f1 represents the first frequency corresponding to the first frequency waveform.
f represents the fundamental frequency corresponding to the fundamental frequency waveform;
when the second time period that the second frequency waveform occupies the preset period is shorter than the first time period that the first frequency waveform occupies the preset period, the condition below is satisfied:

$$\delta = f_1 - \frac{f}{2} > 0, \text{ and } \delta \in \left(0, \frac{f}{2}\right)$$

δ means frequency difference.
f1 represents the first frequency corresponding to the first frequency waveform;
f represents the fundamental frequency corresponding to the fundamental frequency waveform.

In addition, after using the fundamental frequency waveform as the displacement waveform of the vibrator of the linear motor, the method further includes steps of:
perform a plurality of copies of the displacement waveform to obtain several copies of the displacement waveform;
splicing the displacement waveform with the multiple displacement waveforms to obtain a target displacement waveform; and
the step of calculating the voltage waveform corresponding to the linear motor within the preset period according to the displacement waveform includes a step of:
calculating a corresponding drive voltage waveform of the linear motor according to the target displacement waveform.

In addition, after obtaining the target displacement waveform, the method further includes a step of:
performing smoothing transition processing on the first x displacement waveforms of a start segment and last y displacement waveforms of an end segment of the target displacement waveform to obtain an optimized target displacement waveform.

In addition, after obtaining the optimized target displacement waveform, the method further includes steps of:
calculate the corresponding acceleration change rate waveform and displacement change rate waveform according to the target displacement waveform;
determining whether the voltage amplitude of each cycle in the drive voltage waveform is equal to the maximum voltage value of the linear motor;
if the voltage amplitude of each cycle is equal to the maximum voltage value, then saving the first difference between the maximum acceleration change rate and the minimum acceleration change rate in the acceleration change rate waveform, saving the second difference between the maximum displacement change rate and the minimum displacement change rate in the displacement change rate waveform, and the amount of vibration of the linear motor, the frequency difference, the first frequency and the second frequency corresponding to the second frequency waveform;

if the voltage amplitude of each cycle is not equal to the maximum voltage value, the frequency difference is gradually increased to obtain the increased frequency difference; triggering the execution of the steps in which the fundamental frequency waveform is formed by sequential splicing of the first frequency waveform and the second frequency waveform.

In addition, firstly save the first difference between the maximum acceleration change rate and the minimum acceleration change rate in the acceleration change rate waveform, save the second difference between the maximum displacement change rate and the minimum displacement change rate in the displacement change rate waveform, the amount of vibration of the linear motor, the frequency difference, the first frequency and the second frequency corresponding to the second frequency waveform; after, the method further includes steps of:

gradually increasing the displacement amplitude of the displacement waveform to obtain an enlarged displacement waveform; triggering execution of the step of smooth transition processing on the first x displacement waveforms of the start segment and the last y displacement waveforms of the end segment in the target displacement waveform.

The present invention further provides a linear motor driving voltage generation device, including:

a definition unit, for defining a displacement waveform of the linear motor's vibrator within a preset period, the displacement waveform being an asymmetrical waveform;

a computing unit, for calculating a voltage waveform corresponding to the linear motor in the preset period according to the displacement waveform.

The present invention further provides a computer equipment, including:

a processor, a memory, a bus, an input and output interface, wherein the processor is connected to the memory and the input and output interface through a bus;

programs are stored in the memory;

when the processor executes the program stored in the memory, the driving voltage generation method as described in claim 1 is implemented.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

The first thing to note is that human perception of vibration is non-linear. When people experience strong and weak vibration stimuli in sequence in a short period of time, they will obviously perceive strong vibration stimuli. It does not clearly perceive weak vibration stimuli. Based on this, if a strong vibration stimulus in a specific direction is applied to a person in a continuous time period, the person can have a tactile sensation of moving in a specific direction.

Figure 1:
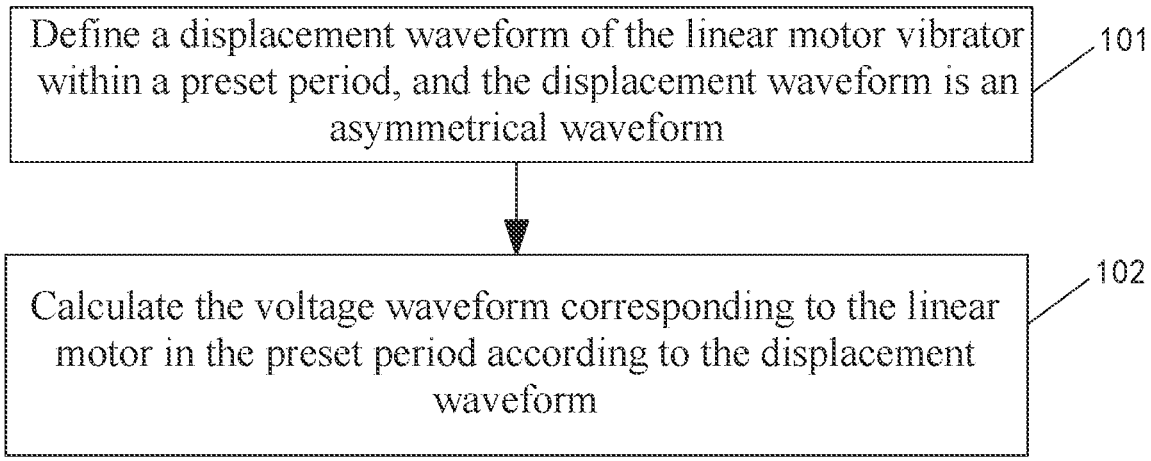
FIG. 1 is a schematic view of an embodiment process of a driving voltage generation method of a linear motor of the present invention.
Figure 3:
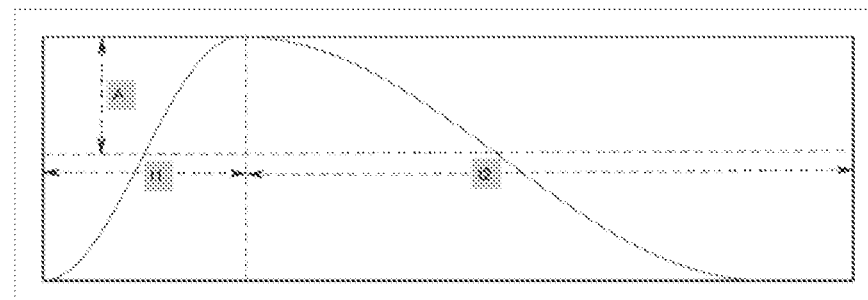
FIG. 3 is a schematic view of the asymmetric displacement waveform in one cycle of the vibrator of the linear motor of the present invention.

Please refer to FIG. 1 and FIG. 3 in combination. an embodiment of the method for generating a driving voltage of a linear motor of the present invention includes:

101. Define the displacement waveform of the linear motor vibrator within a preset period, and the displacement waveform is an asymmetrical waveform.

As we all know, the movement of the linear motor's vibrator is cyclical. In this step, only needs to define the displacement waveform of the linear motor vibrator within a preset period, and then the voltage waveform of the linear motor can be formed according to the defined displacement waveform in the subsequent steps. Furthermore, the voltage waveform can be used to control the vibration effect of the linear motor's vibrator along the displacement waveform track. This step defines the displacement waveform of the linear motor vibrator within a preset period as an asymmetrical waveform. For example, referring to FIG. 3, the so-called asymmetrical waveform means that the time t1 required for the linear motor's vibrator to move from the front end to the second end is different from the time t2 required to move from the second end to the front end. The displacement waveform formed in one cycle is asymmetric, so it is called asymmetrical waveform. Define a preset period t (corresponding to frequency f), the displacement of the linear motor's vibrator is composed of frequency (corresponding to period) and (corresponding to period). It means that the motor vibrator moves quickly from one end to the other end in a short period of time t1, and then slowly returns to the initial position in a longer period of time t2, causing asymmetric vibration acceleration.

$$T = t_1 + t_2$$

$$t_1 = \frac{T_1}{2} = \frac{1}{2f_1}; t_2 = \frac{T_2}{2} = \frac{1}{2f_2}$$

Introduce the difference between frequency $f_1$ and $\frac{f}{2}$, denoted as frequency difference $\delta$, then:

$\delta = f_1 - \frac{f}{2} > 0$, when QUOTE $\delta 1 = f2$, the displacement is sine wave. $\delta \in \left(0, \frac{f}{2}\right)$ and $\delta \in \left(\frac{f}{2}, \infty\right)$ indicate asymmetric displacement in the opposite direction.

102. Calculate the voltage waveform corresponding to the linear motor in the preset period according to the displacement waveform.

After obtaining the displacement waveform of the vibrator of the linear motor through step 101, the inherent parameters of the linear motor are combined. That is, the vibrator that controls the linear motor can realize the voltage waveform of the displacement waveform in step 101 through simulation calculation in the prior art.

The driving voltage generation method of the linear motor of the present invention defines the displacement waveform of the vibrator of the linear motor in one cycle. And the displacement waveform is an asymmetrical waveform, which makes the reciprocating motion of the linear motor in the period asymmetric. That is, the forward speed of the linear motor's vibrator in this cycle is faster than the return speed. Or, the return speed of the linear motor's vibrator in this cycle is faster than the forward speed. As people receive strong and weak vibration stimuli in turn, they will obviously perceive strong vibration stimuli, but cannot clearly perceive weak vibration stimuli. Therefore, the voltage waveform corresponding to the linear motor in the preset period is calculated according to the above displacement waveform. When the linear motor is driven by the voltage waveform, the vibration stimulation in a specific direction can be felt.

Figure 2:
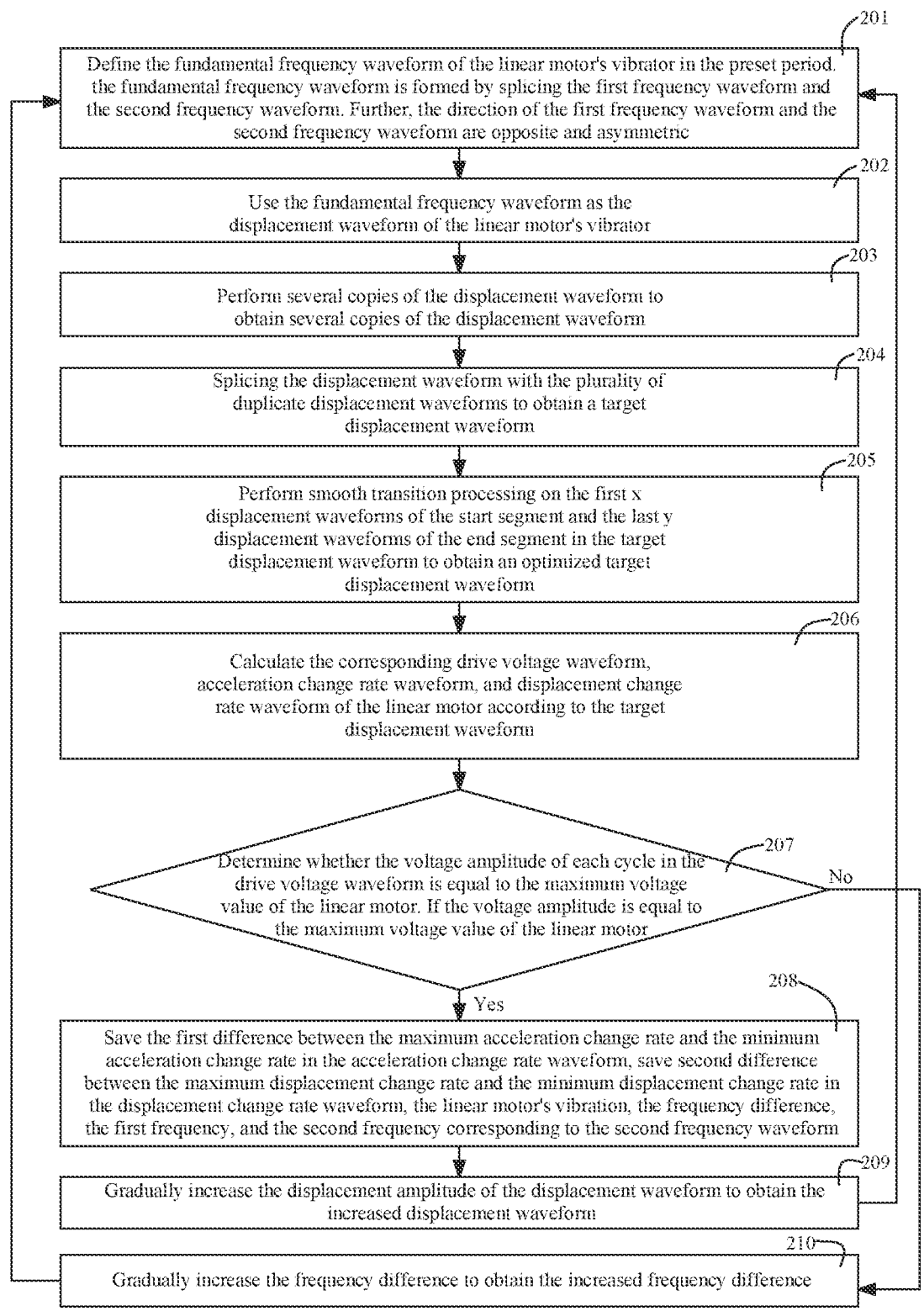
FIG. 2 is a schematic view of another embodiment process of the driving voltage generation method of the linear motor of the present invention.

Please refer to FIG. 2. Another embodiment of the driving voltage generation method of the linear motor of the present invention includes:

201. Define the fundamental frequency waveform of the linear motor's vibrator in the preset period. the fundamental frequency waveform is formed by splicing the first frequency waveform and the second frequency waveform. Further, the direction of the first frequency waveform and the second frequency waveform are opposite and asymmetric.

It can be seen from the above embodiment that the movement of the vibrator of the linear motor is cyclical. In this embodiment, the fundamental frequency waveform of the linear motor vibrator within a preset period can be defined. Then, in the subsequent steps, the displacement waveform of the linear motor's vibrator can be formed according to the defined basic waveform. Further calculate the voltage waveform of the linear motor based on the displacement waveform. The voltage waveform can be used to control the linear motor's vibrator to vibrate along the displacement waveform track. This step defines the fundamental frequency waveform of the linear motor vibrator within the preset period. The fundamental frequency waveform can be determined by determining the corresponding fundamental frequency and the amplitude range corresponding to the fundamental frequency waveform (for example, [0.05:0.05:1]mm). The fundamental frequency waveform is formed by the splicing of the first frequency waveform and the second frequency waveform, and the directions of the first frequency waveform and the second frequency waveform are opposite and asymmetric.

Preferably, the fundamental frequency waveform may be formed by sequentially splicing the first frequency waveform and the second frequency waveform. One type of embodiment can be that the first time period occupied by the first frequency waveform in the preset period is shorter than the second time period occupied by the second frequency waveform in the preset period. In other words, the first frequency corresponding to the first frequency waveform is greater than the second frequency corresponding to the second frequency waveform. That is, the first frequency is greater than half of the fundamental frequency of the entire preset period, as shown in the following formula:

$$\delta = f_1 - \frac{f}{2} > 0 \text{, and } \delta \in \left(0, \frac{f}{2}\right).$$

$\delta$ means frequency difference.

f1 represents the first frequency corresponding to the first frequency waveform.

f represents the fundamental frequency corresponding to the fundamental frequency waveform.

Another type of embodiment may be that the second time period occupied by the second frequency waveform of the preset period is shorter than the first time period occupied by the first frequency waveform of the preset period. In other words, the second frequency corresponding to the second frequency waveform is greater than the first frequency corresponding to the first frequency waveform. That is, the second frequency is greater than half of the fundamental frequency of the entire preset period, as shown in the following formula:

$$\delta = f_1 - \frac{f}{2} > 0 \text{, and } \delta \in \left(0, \frac{f}{2}\right)$$

$\delta$ means frequency difference.

f1 represents the first frequency corresponding to the first frequency waveform.

f represents the fundamental frequency corresponding to the fundamental frequency waveform.

This step may define Frequency Difference $\delta$, and the range of the Frequency Difference can be determined according to actual needs, for example $\left[1:0.1:\frac{f}{2}\right]$.

202. Use the fundamental frequency waveform as the displacement waveform of the linear motor's vibrator.

203. Perform several copies of the displacement waveform to obtain several copies of the displacement waveform.

After obtaining the displacement waveform within a preset period of the vibrator of the linear motor in step 202, in this step, the displacement waveform can be copied several times according to the actual situation to obtain several copies of the displacement waveform. It is understandable that after the displacement waveform of the vibrator of the linear motor is determined in step 202, the time occupied by the preset period corresponding to the displacement waveform can be changed as a whole. Furthermore, in this step, the number of displacement waveforms can be copied according to the actual frequency expressed by the linear motor. For example, if a frequency expression of 70 Hz is required, 70 displacement waveforms can be formed in one second in this step.

204. Splicing the displacement waveform with the plurality of duplicate displacement waveforms to obtain a target displacement waveform.

Figure 4:
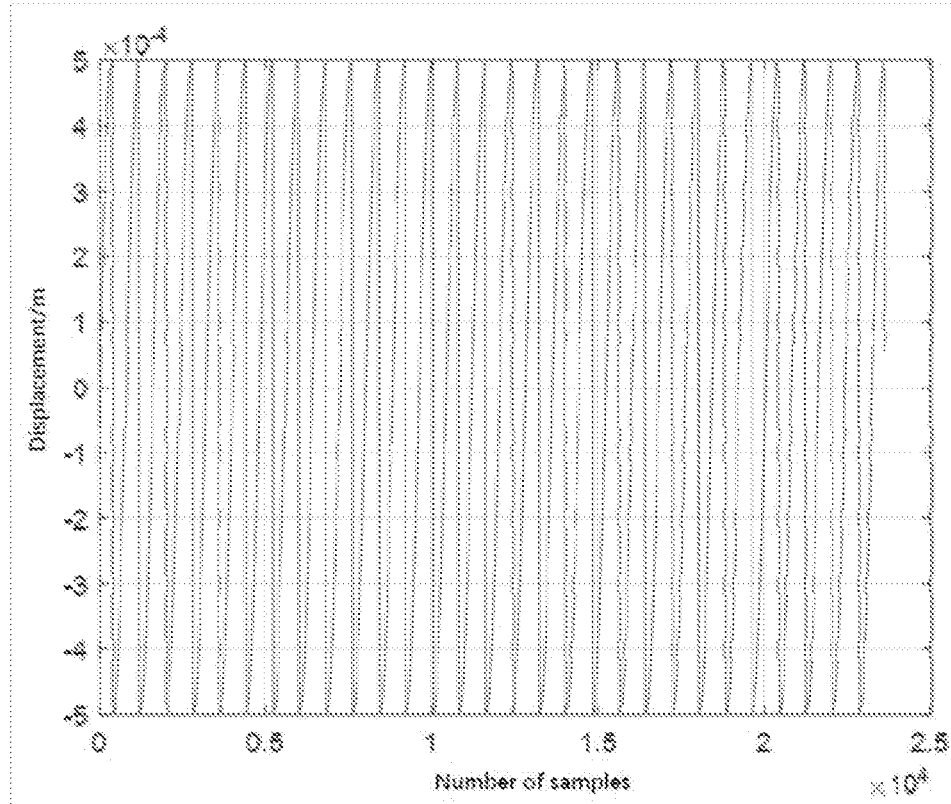
FIG. 4 is a schematic view of the asymmetric displacement waveform of the fundamental frequency formed by splicing the first frequency waveform and the second frequency waveform according to the present invention.

Please refer to FIG. 4, which is a schematic view of an embodiment of the asymmetric displacement waveform of the fundamental frequency formed by splicing the first frequency waveform and the second frequency waveform in the present invention.

205. Perform smooth transition processing on the first x displacement waveforms of the start segment and the last y displacement waveforms of the end segment in the target displacement waveform to obtain an optimized target displacement waveform.

Figure 5:
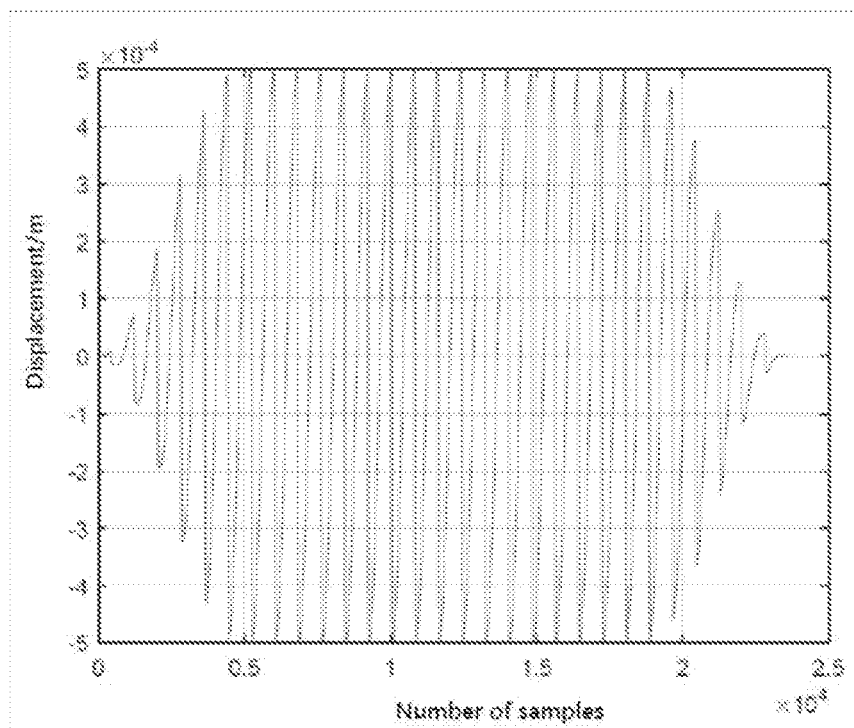
FIG. 5 is a schematic view of the asymmetric displacement waveform after smooth transition processing is performed on the start segment and the end segment of the asymmetric displacement waveform in FIG. 4.

Low-pass filtering is performed on the target displacement waveform formed in step 204, and smooth transition processing is performed on the first x displacement waveforms of the start segment and the last y displacement waveforms of the end segment in the target displacement waveform to obtain an optimized target displacement waveform. Here x and y are positive integers greater than 0, preferably x is equal to y, so as to achieve smooth start and stop of the linear motor. Avoid that the instantaneous voltage of the linear motor in the starting and ending sections is too high, which may cause the motor to crack. Please refer to FIG. 5. FIG. 5 is a schematic view of the asymmetric displacement waveform after smooth transition processing is performed on the start segment and the end segment of the asymmetric displacement waveform in FIG. 4.

206. Calculate the corresponding drive voltage waveform, acceleration change rate waveform, and displacement change rate waveform of the linear motor according to the target displacement waveform.

In step 205, the displacement waveform of the vibrator of the linear motor is obtained, and then together with the inherent parameters of the linear motor, the vibrator that controls the linear motor can be simulated and calculated in the prior art to realize the drive voltage waveform of the displacement waveform in step 205. At the same time, parameters such as velocity change rate waveform and displacement change rate waveform can be calculated.

207. Determine whether the voltage amplitude of each cycle in the drive voltage waveform is equal to the maximum voltage value of the linear motor. If the voltage amplitude is equal to the maximum voltage value of the linear motor, step 208 is executed. If the voltage amplitude is not equal to the maximum voltage value of the linear motor, step 210 is executed.

208. Save the first difference between the maximum acceleration change rate and the minimum acceleration change rate in the acceleration change rate waveform, save second difference between the maximum displacement change rate and the minimum displacement change rate in the displacement change rate waveform, the linear motor's vibration, the frequency difference, the first frequency, and the second frequency corresponding to the second frequency waveform.

When it is determined in step 207 that the voltage amplitude of each cycle in the drive voltage waveform is equal to the maximum voltage value of the linear motor. Then in this step, in step 206, save the calculated data: the first difference between the maximum acceleration change rate and the minimum acceleration change rate in the acceleration change rate waveform; the second difference between the maximum displacement change rate and the minimum displacement change rate in the displacement change rate waveform, the linear motor's vibration, the frequency difference, the first frequency, and the second frequency corresponding to the second frequency waveform.

209. Gradually increase the displacement amplitude of the displacement waveform to obtain the increased displacement waveform, and trigger the execution of step 201.

After step 208, this step can gradually increase the displacement amplitude of the displacement waveform to obtain the increased displacement waveform, and trigger the execution of step 201 until the amplitude range corresponding to the fundamental frequency waveform is traversed. In step 208, the following actually measured data is saved:

the first difference between the maximum acceleration change rate and the minimum acceleration change rate in the acceleration change rate waveform, the second difference between the maximum displacement change rate and the minimum displacement change rate in the displacement change rate waveform, the linear motor's vibration, the frequency difference, the first frequency, and the second frequency corresponding to the second frequency waveform. The drive voltage waveform corresponding to the above saved data is the final optimal drive voltage waveform.

210. Gradually increase the frequency difference to obtain the increased frequency difference, and trigger the execution of step 201.

After step 207, when it is determined that the voltage amplitude of each cycle in the drive voltage waveform is not equal to the maximum voltage value of the linear motor, then in this step gradually increase the frequency difference to get the increased frequency difference. After that, step 201 is triggered to execute until the traversal of the value range of frequency difference is completed.

Figure 6:
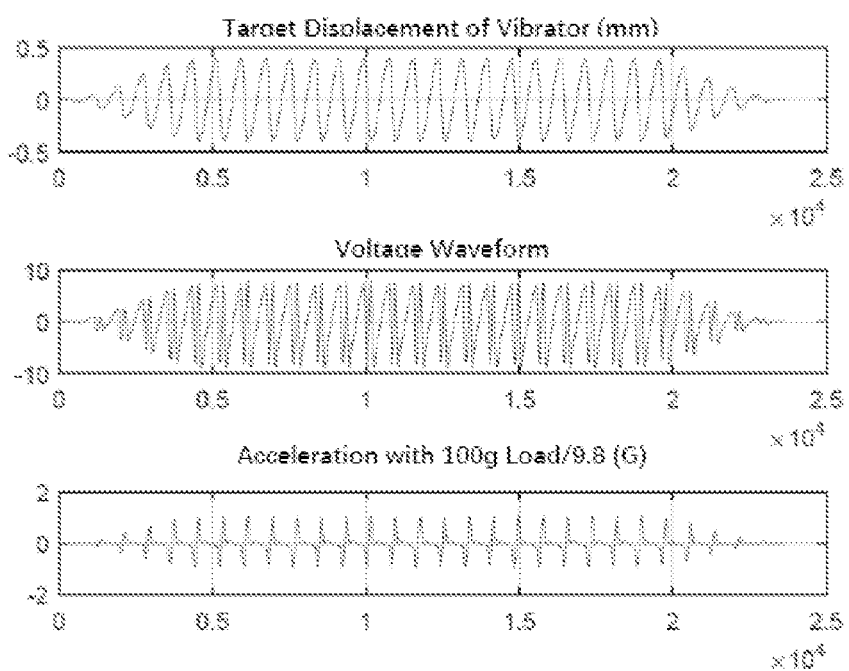
FIG. 6 is a comparison example of the drive voltage waveform generated by the driving voltage generation method of the linear motor and the vibrator target displacement and 100 g load acceleration of the present invention.
Figure 7:
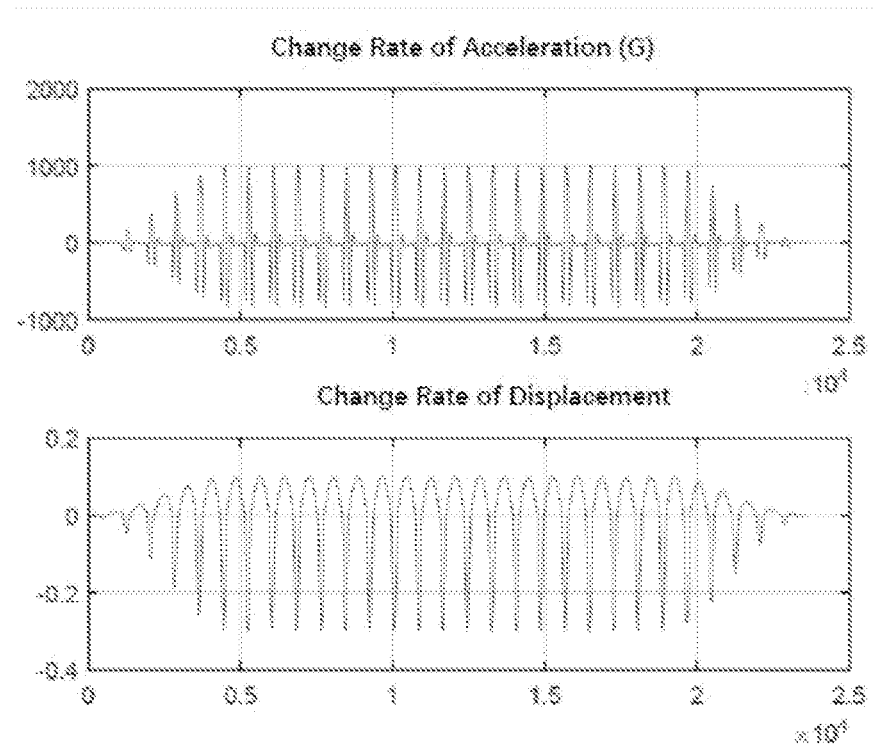
FIG. 7 is a comparison example of the acceleration change rate and displacement change rate of the linear motor vibrator under the action of the drive voltage waveform generated in FIG. 6.

Please refer to FIG. 6 and FIG. 7, after actual measurement: FIG. 6 shows a comparison example of the drive voltage waveform generated by the driving voltage generation method of the linear motor and the vibrator target displacement and 100 g load acceleration. FIG. 7 is a comparison example of the acceleration change rate and displacement change rate of the linear motor vibrator under the action of the drive voltage waveform generated in FIG. 6.

Figure 8:
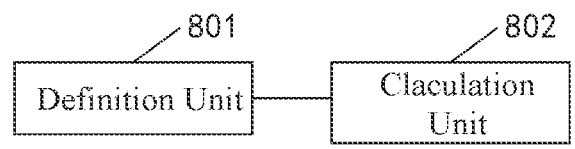
FIG. 8 is a schematic view of an embodiment structure of the driving voltage generation device of the linear motor of the present invention.

The driving voltage generation method of the linear motor of the present invention is described above. The following describes the driving voltage generation device of the linear motor of the present invention, please refer to FIG. 8, including:

a definition unit 801, which is used to define the displacement waveform of the vibrator of the linear motor within a preset period, and the displacement waveform is an asymmetrical waveform.

a computing unit 802, which is used to calculate the voltage waveform corresponding to the linear motor within the preset period according to the displacement waveform.

The operation performed by the driving voltage generation device of the embodiment linear motor of the present invention is similar to the operation performed in the aforementioned embodiment in FIG. 1, and will not be repeated here.

The driving voltage generation device of the linear motor of the present invention defines the displacement waveform of the vibrator of the linear motor in one cycle, and the displacement waveform is an asymmetrical waveform, which makes the reciprocating motion of the linear motor in the cycle asymmetrical. That is, the forward speed of the linear motor's vibrator in this cycle is faster than the return speed. Or, the return speed of the linear motor's vibrator in this cycle is faster than the forward speed. As people receive strong and weak vibration stimuli in turn, they will obviously perceive strong vibration stimuli, but cannot clearly perceive weak vibration stimuli. Therefore, when the voltage waveform corresponding to the linear motor in the preset period is calculated according to the above displacement waveform, and the linear motor is driven by the voltage waveform, the vibration stimulation in a specific direction can be realized.

Figure 9:
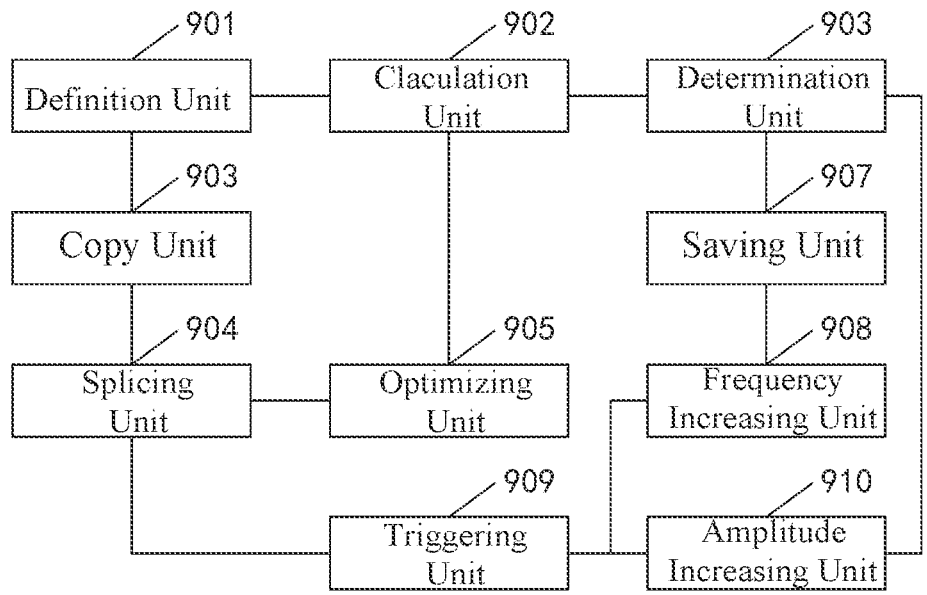
FIG. 9 is a schematic view of another embodiment structure of the driving voltage generation device of the linear motor of the present invention.
Figure 10:
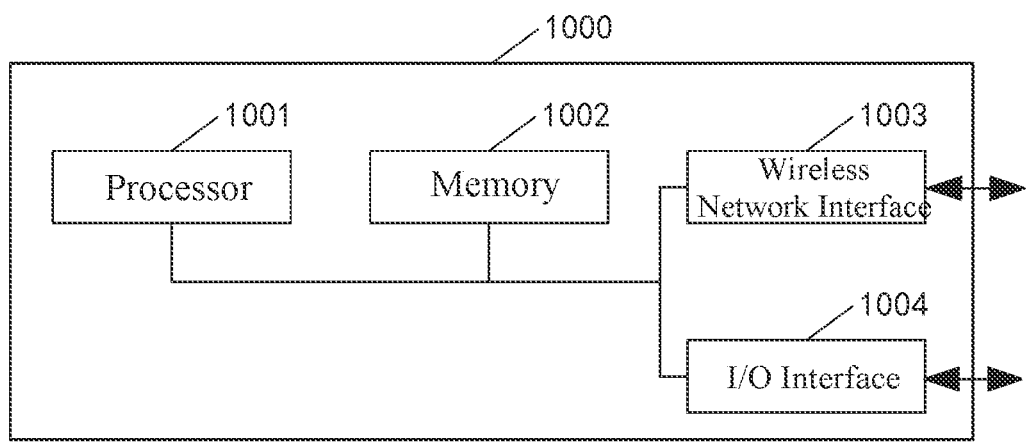
FIG. 10 is a schematic view of an embodiment structure of the computer equipment of the present invention.

Please refer to FIG. 9, another embodiment of the voltage generating device of the linear motor of the present invention, including:

a definition unit 901, which is used to define the displacement waveform of the vibrator of the linear motor within a preset period, and the displacement waveform is an asymmetrical waveform.

a computing unit 902, which is used to calculate the voltage waveform corresponding to the linear motor within the preset period according to the displacement waveform.

Optionally, the definition unit 901 is specifically used for defining the displacement waveform of the linear motor within a preset period, and the displacement waveform is an asymmetrical waveform:

Define the fundamental frequency waveform of the linear motor vibrator within the preset period. The fundamental frequency waveform is formed by the splicing of the first frequency waveform and the second frequency waveform, and the first frequency waveform and the second frequency waveform have opposite directions and are asymmetrical.

The fundamental frequency waveform is used as the displacement waveform of the linear motor's vibrator.

Optionally, that the fundamental frequency is formed by splicing the first frequency waveform and the second frequency waveform specifically includes:

The fundamental frequency waveform is formed by sequentially splicing the first frequency waveform and the second frequency waveform. The first time period that the first frequency waveform occupies the preset period is shorter than the second time period that the second frequency waveform occupies the preset period. Or, the second time period that the second frequency waveform occupies the preset period is shorter than the first time period that the first frequency waveform occupies the preset period.

Optionally, the first time period that the first frequency waveform occupies the preset period is shorter than the second time period that the second frequency waveform occupies the preset period, which specifically includes:

$$\delta = f_1 - \frac{f}{2} > 0, \text{ and } \delta \in \left(\frac{f}{2}, \infty\right)$$

δ means frequency difference.

f1 represents the first frequency corresponding to the first frequency waveform.

f represents the fundamental frequency corresponding to the fundamental frequency waveform. Or, the second time period that the second frequency waveform occupies the preset period is shorter than the first time period that the first frequency waveform occupies the preset period, including:

$$\delta = f_1 - \frac{f}{2} > 0, \text{ and } \delta \in \left(0, \frac{f}{2}\right)$$

δ means frequency difference.

f1 represents the first frequency corresponding to the first frequency waveform.

f represents the fundamental frequency corresponding to the fundamental frequency waveform.

Optionally, the device further includes:

a copying unit 903, which is used to perform several copies of the displacement waveform to obtain several copies of the displacement waveform.

a splicing unit 904, which is used for splicing the displacement waveform with the plurality of copy displacement waveforms to obtain a target displacement waveform.

When the computing unit 902 obtains the corresponding voltage waveform of the linear motor in the preset period according to the displacement waveform, it is specifically used for:

The corresponding drive voltage waveform of the linear motor is calculated according to the target displacement waveform.

Optionally, the device further includes:

an optimization unit 905, which is used to perform smooth transition processing on the first x displacement waveforms of the start segment and the last y displacement waveforms of the end segment in the target displacement waveform to obtain an optimized target displacement waveform.

Optionally, the device further includes:

The computing unit 902 is also used to calculate the corresponding acceleration change rate waveform and displacement change rate waveform according to the target displacement waveform.

The judgment unit 906 is used to judge whether the voltage amplitude of each cycle in the drive voltage waveform is equal to the maximum voltage value of the linear motor.

The saving unit 907 is configured to save the following data if the voltage amplitude of each cycle is equal to the maximum voltage value: the first difference between the maximum acceleration change rate and the minimum acceleration change rate in the acceleration change rate waveform, the second difference between the maximum displacement change rate and the minimum displacement change rate in the displacement change rate waveform, the vibration amount of the linear motor, the frequency difference, the first frequency, and the second frequency corresponding to the second frequency waveform.

The frequency increasing unit 908 is used for if the voltage amplitude of each cycle is not equal to the maximum voltage value. Then, the frequency difference is gradually increased, and the increased frequency difference is obtained.

The triggering unit 909 is used to trigger the execution of the step of sequential splicing of the first frequency waveform and the second frequency waveform on the fundamental frequency waveform.

Optionally, the device further includes:

The amplitude increasing unit 910 is used to gradually increase the displacement amplitude of the displacement waveform to obtain an increased displacement waveform.

The triggering unit 909 is also used to trigger execution steps: Smooth transition processing the first x displacement waveforms of the initial segment in the target displacement waveform and the last y displacement waveforms of the end segment.

The operation performed by the driving voltage generation device of the embodiment linear motor of the present invention is similar to the operation performed in the aforementioned embodiment in FIG. 2, and will not be repeated here.

The computer equipment in the embodiment of the present invention will be described below. Refer to Fig. 1000, an embodiment of computer equipment in the embodiment of the present invention includes:

The computer equipment 1000 may include one or more processors (central processing units, cpu) 1001 and a memory 1002, and the memory 1002 stores one or more application programs or data. Wherein, memory 1002 is volatile storage or persistent storage. The program stored in memory 1002 may include one or more modules. Each module can include a series of command operations in computer equipment. Furthermore, the processor 1001 may be set to communicate with the memory 1002, and execute a series of instruction operations in the memory 1002 on the computer equipment 1000. The computer equipment 1000 may also include one or more wireless network interfaces 1003, and one or more input and output interfaces 1004. And/or, one or more operating systems, such as windows server, mac os, unix, linux, freebsd, etc. The processor 1001 can perform the operations performed in the aforementioned embodiment shown in FIG. 1 to FIG. 2, and details are not repeated here.

Among the several embodiments provided by the embodiment of the present invention, those skilled in the art should understand that the disclosed system, device, and method can be implemented in other ways. For example, the device embodiment described above is only illustrative. For example, the division of the unit is only a logical function division, and there may be other division methods in actual implementation. For example, multiple units or components can be combined or integrated into another system, or some features can be omitted or not implemented. In addition, the displayed or discussed mutual coupling or direct coupling or communication connection may be through some interfaces. The indirect coupling or communication connection of a device or unit can be in electrical, mechanical or other forms.

In addition, each functional unit in each embodiment of the present invention may be integrated into one processing unit, or each unit may exist alone physically, or two or more units may be integrated into one unit. The above-mentioned integrated unit can be implemented in the form of hardware or software functional unit. If the integrated unit is implemented in the form of a software functional unit and sold or used as an independent product, it can be stored in a computer readable storage medium. Based on this understanding, the technical solution of the present invention can be embodied in the form of a software product in essence or a part that contributes to the existing technology, or all or part of the technical solution.

The computer software product is stored in a storage medium and includes a number of instructions to make a computer equipment (which may be a personal computer, a server, or a network device, etc.) execute all or part of the steps of each embodiment method of the present invention. The aforementioned storage medium includes: U disk, mobile hard disk, read-only memory (rom, read-only memory), random access memory (ram, random access memory), magnetic disk or CD-ROM and other media that can store program code.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A driving voltage generation method of a linear motor, including steps of:
defining a displacement waveform of the linear motor's vibrator within a preset period, the displacement waveform being an asymmetrical waveform;
calculating a voltage waveform corresponding to the linear motor in the preset period according to the displacement waveform.

2. The driving voltage generation method of the linear motor as described in claim 1, wherein, the step of defining the displacement waveform of the linear motor within a preset period includes:
defining a fundamental frequency waveform of the linear motor's vibrator within the preset period, the fundamental frequency waveform being formed by splicing a first frequency waveform and a second frequency waveform having opposite directions and being asymmetrical;
using the fundamental frequency waveform as the displacement waveform of the linear motor's vibrator.

3. The driving voltage generation method of the linear motor as described in claim 2, wherein, the step of forming the fundamental frequency includes:
forming the fundamental frequency waveform by sequentially splicing the first frequency waveform and the second frequency waveform; a first time period that the first frequency waveform occupies the preset period is shorter than a second time period that the second frequency waveform occupies the preset period; or, the second time period that the second frequency waveform occupies the preset period is shorter than the first time period that the first frequency waveform occupies the preset period.

4. The driving voltage generation method of the linear motor as described in claim 3, wherein, when the first time period of the preset period occupied by the first frequency waveform is shorter than the second time period of the preset period occupied by the second frequency waveform, the condition below is satisfied:

$$\delta = f_1 - \frac{f}{2} > 0, \text{ and } \delta \in \left(\frac{f}{2}, \infty\right)$$

where
δ means frequency difference;
f1 represents the first frequency corresponding to the first frequency waveform;
f represents the fundamental frequency corresponding to the fundamental frequency waveform;
when the second time period that the second frequency waveform occupies the preset period is shorter than the first time period that the first frequency waveform occupies the preset period, the condition below is satisfied:

$$\delta = f_1 - \frac{f}{2} > 0, \text{ and } \delta \in \left(0, \frac{f}{2}\right)$$

δ means frequency difference;

f1 represents the first frequency corresponding to the first frequency waveform;

f represents the fundamental frequency corresponding to the fundamental frequency waveform.

5. The driving voltage generation method of the linear motor according to claim 4, wherein, after using the fundamental frequency waveform as the displacement waveform of the vibrator of the linear motor, the method further includes steps of:

perform a plurality of copies of the displacement waveform to obtain several copies of the displacement waveform;

splicing the displacement waveform with the multiple displacement waveforms to obtain a target displacement waveform; and the step of calculating the voltage waveform corresponding to the linear motor within the preset period according to the displacement waveform includes a step of:

calculating a corresponding drive voltage waveform of the linear motor according to the target displacement waveform.

6. The driving voltage generation method of the linear motor according to claim 5, wherein, after obtaining the target displacement waveform, the method further includes a step of:

performing smoothing transition processing on the first x displacement waveforms of a start segment and last y displacement waveforms of an end segment of the target displacement waveform to obtain an optimized target displacement waveform.

7. The driving voltage generation method of linear motor as described in claim 6, wherein, after obtaining the optimized target displacement waveform, the method further includes steps of:

calculate the corresponding acceleration change rate waveform and displacement change rate waveform according to the target displacement waveform;

determining whether the voltage amplitude of each cycle in the drive voltage waveform is equal to the maximum voltage value of the linear motor;

if the voltage amplitude of each cycle is equal to the maximum voltage value, then saving the first difference between the maximum acceleration change rate and the minimum acceleration change rate in the acceleration change rate waveform, saving the second difference between the maximum displacement change rate and the minimum displacement change rate in the displacement change rate waveform, and the amount of vibration of the linear motor, the frequency difference, the first frequency and the second frequency corresponding to the second frequency waveform;

if the voltage amplitude of each cycle is not equal to the maximum voltage value, the frequency difference is gradually increased to obtain the increased frequency difference; triggering the execution of the steps in which the fundamental frequency waveform is formed by sequential splicing of the first frequency waveform and the second frequency waveform.

8. The driving voltage generation method of the linear motor as described in claim 7, wherein, firstly save the first difference between the maximum acceleration change rate and the minimum acceleration change rate in the acceleration change rate waveform, save the second difference between the maximum displacement change rate and the minimum displacement change rate in the displacement change rate waveform, the amount of vibration of the linear motor, the frequency difference, the first frequency and the second frequency corresponding to the second frequency waveform; after, the method further includes steps of:

gradually increasing the displacement amplitude of the displacement waveform to obtain an enlarged displacement waveform; triggering execution of the step of smooth transition processing on the first x displacement waveforms of the start segment and the last y displacement waveforms of the end segment in the target displacement waveform.

9. A computer equipment, including:

a processor, a memory, a bus, an input and output interface, wherein the processor is connected to the memory and the input and output interface through a bus;

programs are stored in the memory;

when the processor executes the program stored in the memory, the driving voltage generation method as described in claim 1 is implemented.

10. A linear motor driving voltage generation device, including:

a definition unit, for defining a displacement waveform of the linear motor's vibrator within a preset period, the displacement waveform being an asymmetrical waveform;

a computing unit, for calculating a voltage waveform corresponding to the linear motor in the preset period according to the displacement waveform.

* * * * *